US 6,630,939 B1

(12) United States Patent
Mills

(10) Patent No.: US 6,630,939 B1
(45) Date of Patent: Oct. 7, 2003

(54) PORTABLE, READ-ONLY ELECTRONIC DISPLAY UNIT

(76) Inventor: Bryan K. Mills, 3880 NE. 17th Ave., Oakland Park, FL (US) 33334

( * ) Notice: Subject to any disclaimer, the term of this patent is extended or adjusted under 35 U.S.C. 154(b) by 447 days.

(21) Appl. No.: 09/596,441

(22) Filed: Jun. 19, 2000

(51) Int. Cl.⁷ ................................................. G09G 5/00
(52) U.S. Cl. ...................................... 345/684; 345/901
(58) Field of Search ................................ 345/684, 685, 345/686, 687, 901, 902, 903, 905

(56) References Cited

U.S. PATENT DOCUMENTS

| | | | | |
|---|---|---|---|---|
| 4,159,417 A | | 6/1979 | Rubincam | 235/375 |
| 5,153,831 A | | 10/1992 | Yianilos | 364/419 |
| 5,467,102 A | * | 11/1995 | Kuno et al. | 345/1 |
| 5,475,399 A | | 12/1995 | Borsuk | 345/130 |
| 5,581,681 A | | 12/1996 | Tchao et al. | 395/804 |
| 5,703,624 A | * | 12/1997 | van Kruistem | 345/901 |
| 5,956,048 A | | 9/1999 | Gaston | 345/507 |
| 6,297,824 B1 | * | 10/2001 | Hearst et al. | 345/357 |

* cited by examiner

*Primary Examiner*—Matthew Luu
(74) *Attorney, Agent, or Firm*—Oltman, Flynn & Kubler

(57) ABSTRACT

A thin, flat, self-contained electronic display unit of substantially the same width and length as a standard letter-sized sheet of paper, with a flat display screen, an input port for receiving data from a selected computer, electronic circuitry for storing inputted data and making it available to the screen, and command buttons or keys enabling the user to select stored data for display on the screen.

4 Claims, 5 Drawing Sheets

PORTABLE, READ-ONLY ELECTRONIC DISPLAY UNIT

BACKGROUND OF THE INVENTION

1. Field of the Invention

This invention relates to a portable electronic display unit for receiving and storing data from any selected computer, and for displaying stored data on command but without the user's possibility of changing the stored data in any way.

The present display unit is a retrieval and display-only device for electronic image data that has already been stored elsewhere, such as in any of central database, single computer or another unit that might be present in an office or school. As such, it answers the need for a simplified, portable, display only device capable of accessing data from multiple sources without the complexities attendant to a personal computer designed for many functions besides reading data from other computers. Multiple units in one environment increase the ease of information dissemination.

2. Prior Art

Electronic books are disclosed in the following U.S. patents: Rubincam U.S. Pat. No. 4,159,417 and Gaston U.S. Pat. No. 5,956,048. In Rubincam the digitally encoded contents of a book are stored in a memory which is removably insertable into the housing of the electronic book. In Gaston the electronic book is plugged into a mated downloading stand from which the encoded contents of a book are downloaded into the electronic book.

Yianilos U.S. Pat. No. 5,153,831 discloses a device having a display screen, an electronic memory with compressed text, and a keyboard for formulating words that are to be searched in that text for display on the screen along with adjoining words as they occur in the text. Borssuk U.S. Pat. No. 5,475,399 discloses a relatively thick, box-like device with a display screen, various keys for controlling the screen display, including keys to change the font size, and an insert port for receiving a memory, such as an EPROM, microfloppy or CD ROM.

BRIEF SUMMARY OF THE INVENTION

The present display unit is designed for the input of data stored in any computer, whether the user's or anyone else's to which the user has authorized access, for read-only display by the user at his or her convenience. In a large office it reduces paperwork by providing a convenient, paper-less way for a worker to access and read the contents of files from a central data base or network.

Preferably, the present display unit is a thin, flat device of substantially the same size as a standard letter-size sheet of paper, so the user's experience with this device approaches the familiar "look-and-feel" of actually reading paper documents.

A principal object of the present invention is to provide a novel and simplified display unit for enabling the user to conveniently read data stored in its internal memory but with no possibility of altering that data in any way. The user has mobile access to files, and information without carrying "paper files."

Further objects and advantages of this invention will be apparent from the following detailed description of a presently preferred embodiment thereof, shown in the accompanying drawings.

DETAILED DESCRIPTION OF THE INVENTION

Before explaining the present invention in detail, it is to be understood that the invention is not limited in its application to the particular arrangement shown since the invention is capable of other embodiments.

Figure 1:
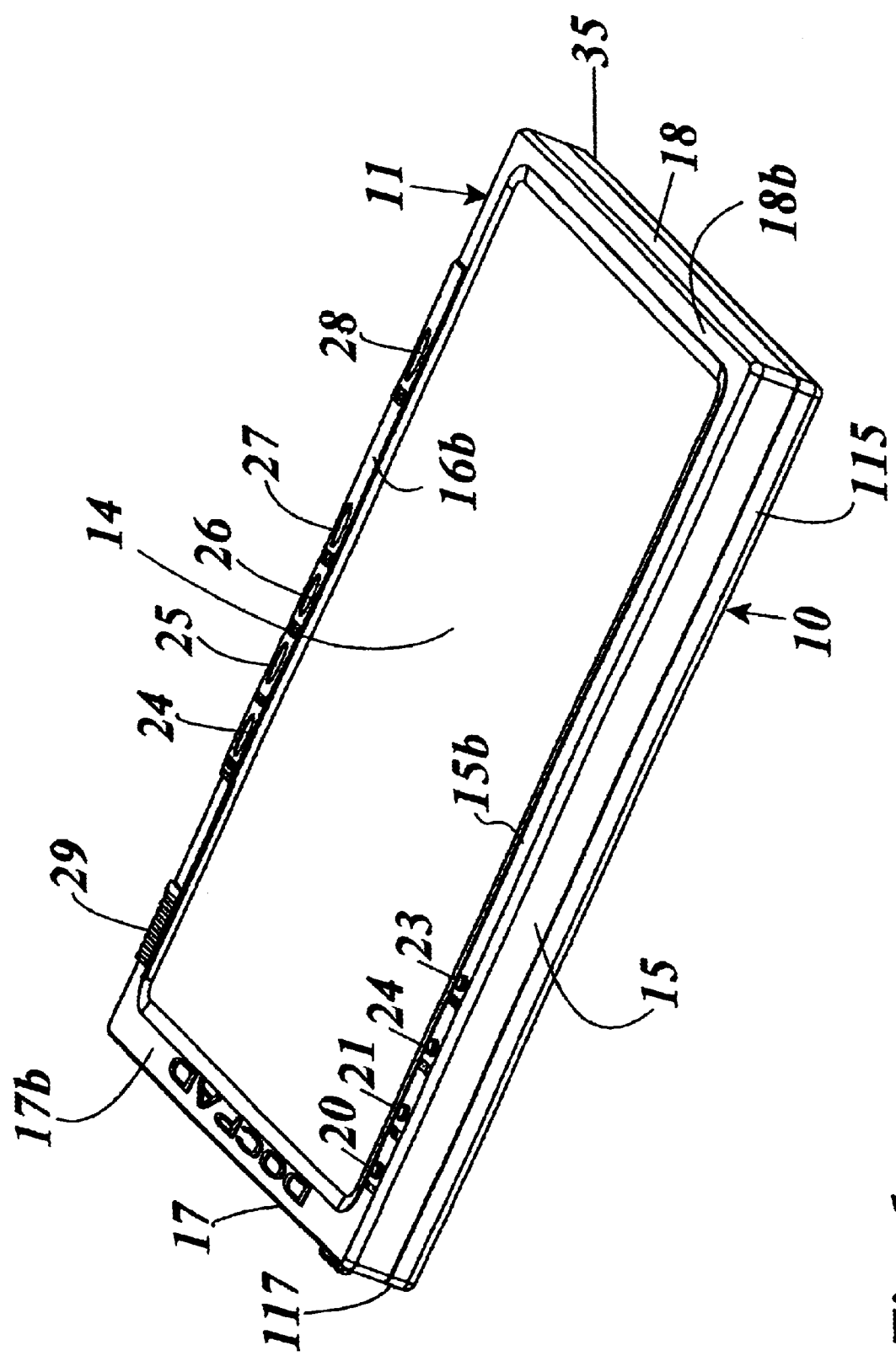
FIG. 1 is a perspective view of the present display unit, taken from in front of the screen.

Referring first to FIG. 1, viewed from the outside the present display unit has a thin, flat, letter-size housing or casing made up of a rectangular base 10 and a similar front or top cover 11 detachably connected to the base in any suitable fashion and covering it when the display unit is in use.

The cover 11 presents a flat LCD (liquid crystal display) panel or screen 14 of substantially rectangular outline. For supporting the screen 14 the cover has a rectangular frame with opposite, narrow, flat side walls 15 and 16, a narrow, flat top wall 17, and a narrow, flat bottom wall 18, and a border for the screen 14 with narrow, flat front segments 15b, 16b, 17b, and 18b which extend in from the correspondingly numbered side, bottom and top walls of the frame. Preferably, the frame is substantially the same size as a standard letter-size sheet of paper, i.e., 8.5 inches wide by 11 inches long, so that the user handling or viewing it receives a mental impression similar to what he or she would get while reading from a standard letter-sized sheet of paper.

The base 10 of the housing has opposite side walls 115 and 116, a top wall 117, and a bottom wall 118 which merge smoothly with the correspondingly numbered (minus 100) walls of the cover when it is closed, as shown in FIG. 1.

On the left front segment 15 of the cover near the top are LED's 20, 21, 22 and 23 for indicating various functions associated with the display unit, such as "power," "battery," "memory," and "test." On the right front segment 16b of the cover are manually operable push-buttons 24, 25, 26, 27 and 28 for initiating various commands to the electronic circuitry that determine what appears on the screen 14, such as "file," "document," "next," "back," and "system." Also on the right front segment 16b near the top is located a mouse-like scroll bar 29 which the user may slide up and down to quickly locate a document, file or particular line of text displayed on the screen 14.

Figure 2:
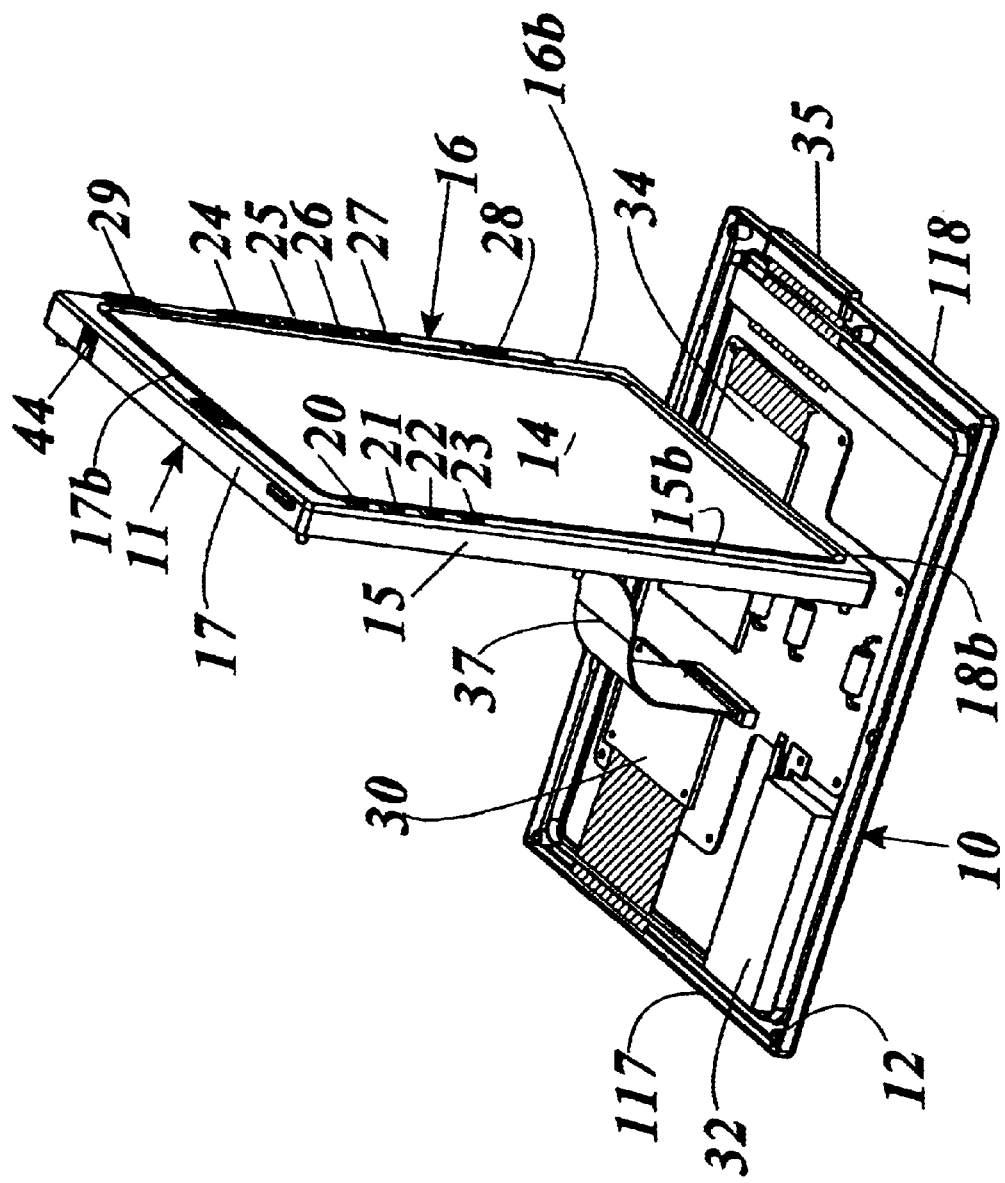
FIG. 2 is an exploded perspective view of the display unit, taken from in front of the screen, with the base and cover of its housing separated to show internal components.
Figure 3:
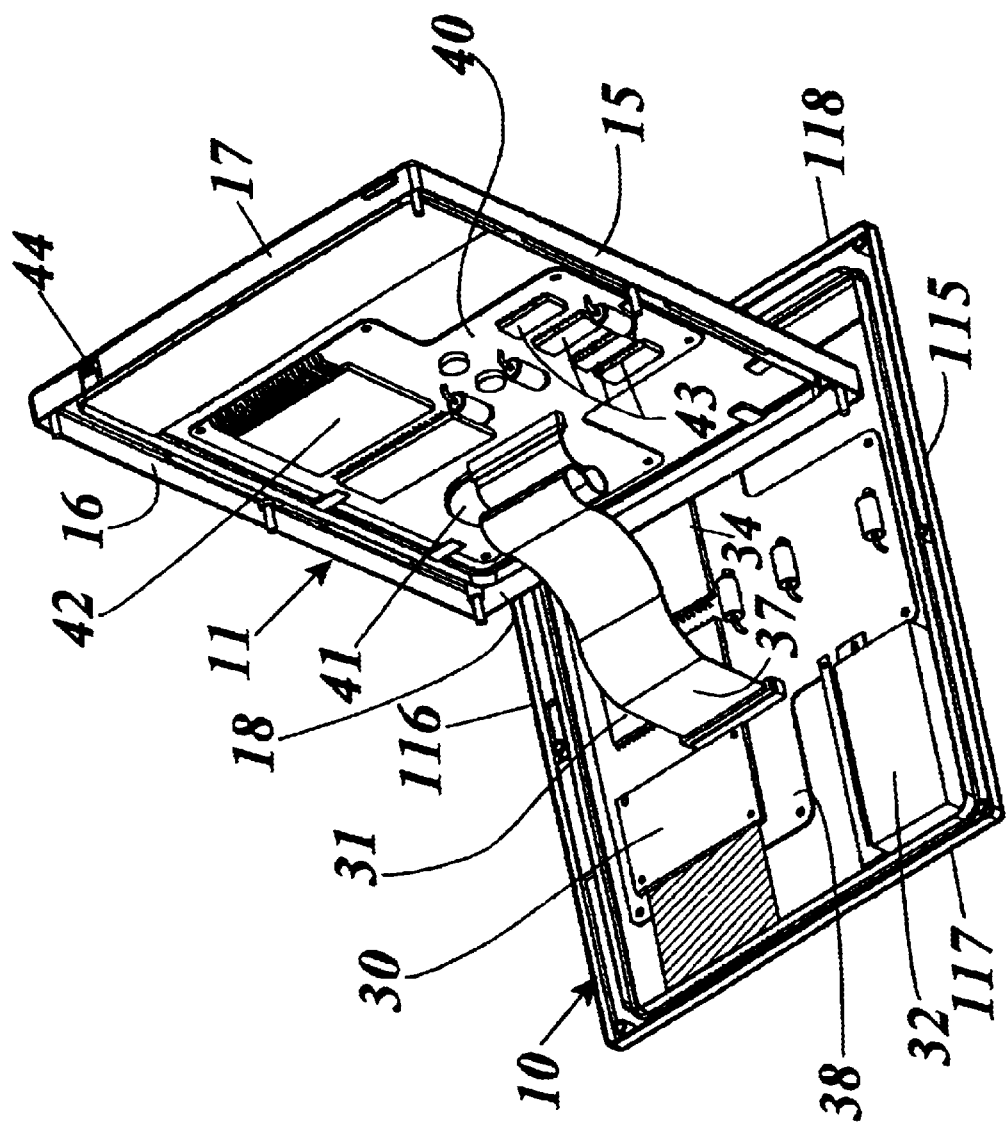
FIG. 3 is a view similar to FIG. 2, but taken from behind the screen.

Referring to FIGS. 2 and 3, the base 10 supports on the inside of the housing the following electronic components of the present display unit: a microprocessor 30, memory chips, 31, a battery pack 32, and a microprocessor 34. A data input port 35 of known design (FIG. 2) is located in the bottom wall 118 of the base. A flexible multi-conductor cable 37 connects the output of microprocessor 30 to the LCD screen 14. The microprocessors 30 and 34, memory chips 31, and various other components of the display unit's electronic circuitry are on a circuit board 38 located on the inside of base 10.

On the back or inner side of the cover 11 a circuit board 40 carries a backup battery 41 for the RAM, a co-processor 42, chips 43 for sound and infra-red functions, and various other electronic components. A backup power input terminal 44 (FIG. 3) is located in the top wall 17 of the cover.

In the use of this device, the user can take it to the location of any computer whose data the user wants to access at his or her convenience. This can be the user's own desktop computer or portable computer, or a computer to which the user has authorized access, or a central network or another electronic image display unit. The user by a well known technique downloads data from that computer into the user's portable display unit via the input port 35. That data now is available for display on the screen 14 any time the user chooses to do so. Thus, an abundance of information is readily and conveniently available to the user without the exchange of any paper documents. Since the present display unit is limited to read-only operation, there is no possibility for the user to alter or corrupt the downloaded data in any way.

Figure 4:
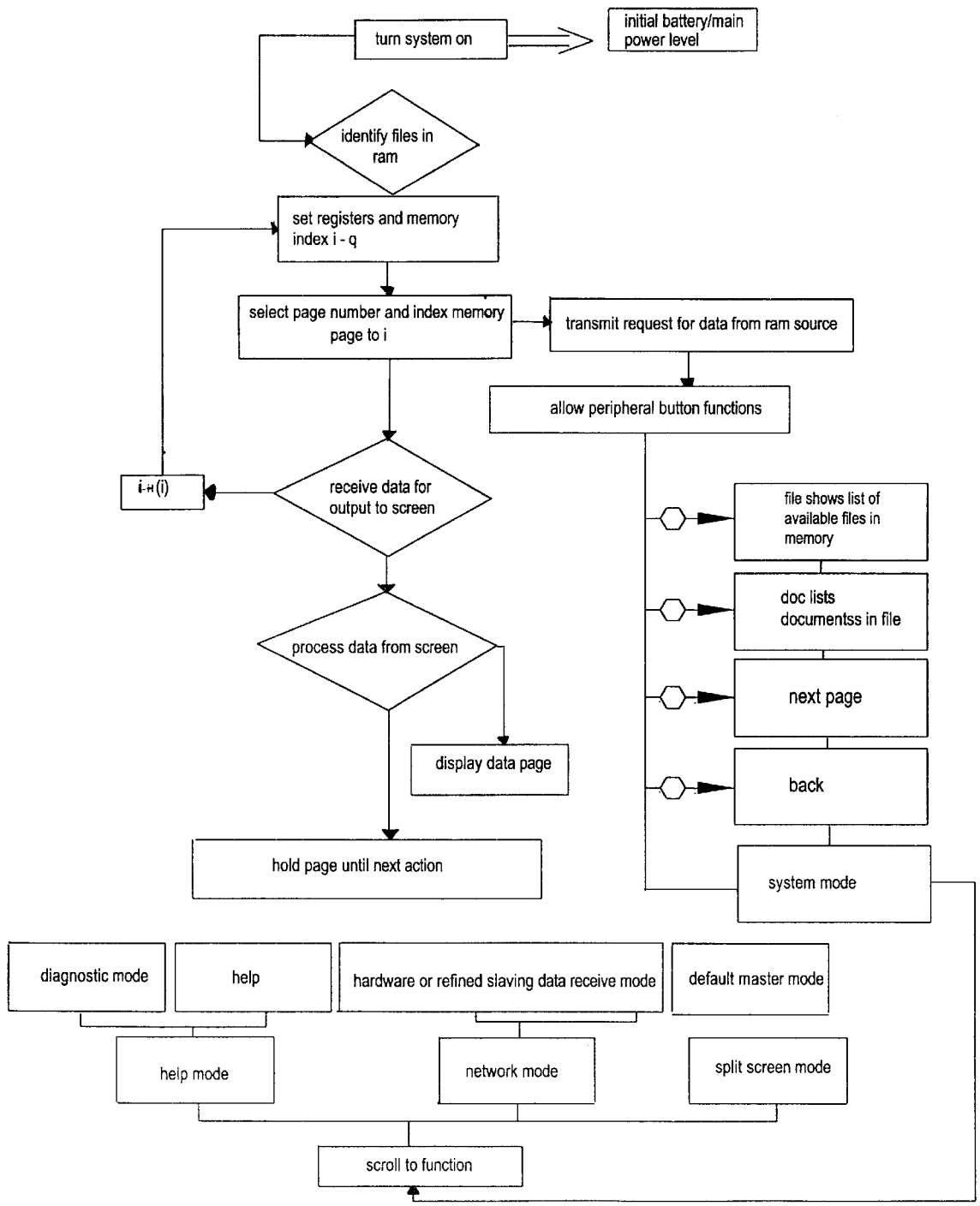
FIG. 4 is a flow diagram showing the operation of the present display device

The flow chart of FIG. 4 is self-explanatory and does not require extensive reiteration. Depressing FILES displays all files loaded into memory; depressing DOC. displays all documents in a selected file; depressing NEXT advances to next document in file; depressing BACK returns to previous document in file.

Figure 5:
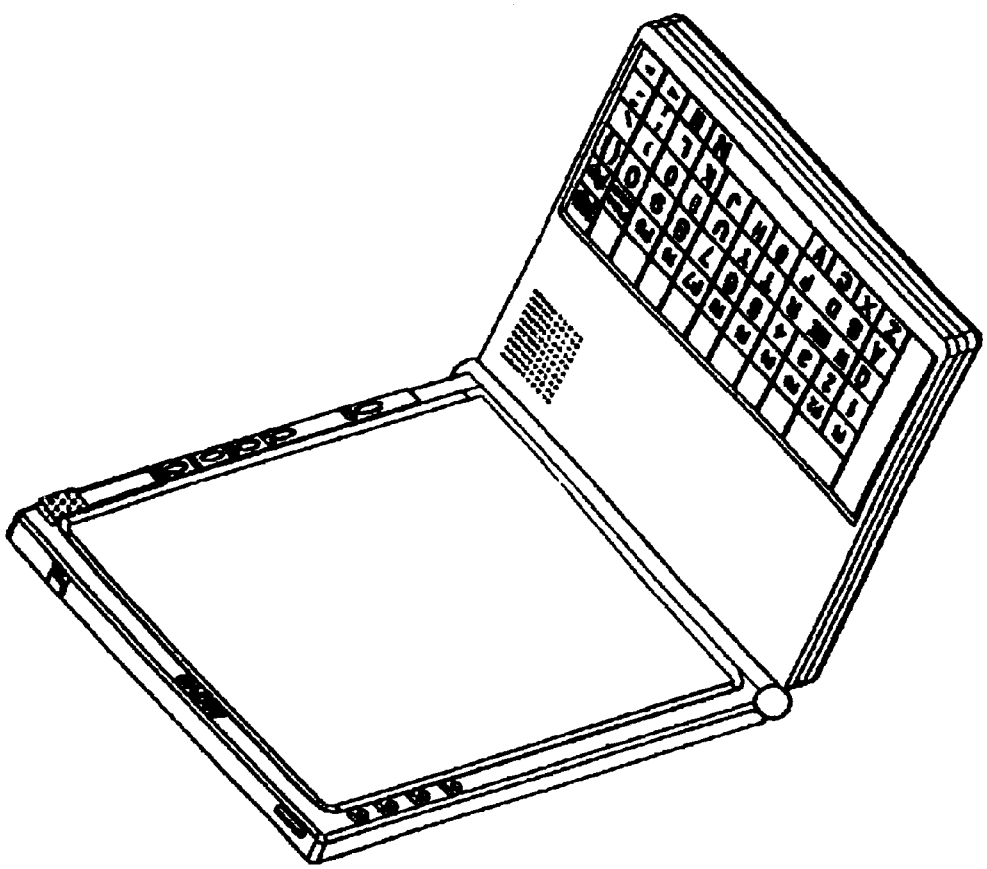
FIG. 5 is a perspective view of a unit as the screen for a laptop computer.

FIG. 5 shows the unit as a removable screen for a laptop computer. The unit functions as normal after removal.

What is claimed is:

1. A portable keyboard-less electronic display unit comprising:

a thin flat housing having substantially the width and length of a standard letter-size page, said housing having a rectangular base and a matching top cover frame above said base;

a flat electronic display screen on said top cover frame occupying substantially the full width and length of said housing, said top cover frame presenting narrow flat segments bordering said screen;

an input port on said housing for receiving computer data from a source external to the display unit;

electronic circuitry in said housing, including computer memory means, for storing data inputted at said input port and for passing said data to said screen for display thereon;

and a plurality of manually operable command elements on one of said narrow flat segments of said top cover frame bordering said screen for enabling user selection of data from said computer memory means for display on said screen.

2. A display unit according to claim 1, wherein said command elements on the housing include a scrolling device for rapid selection of computer data for display on said screen.

3. A display unit according to claim 1, wherein said command elements include an element for moving among different files of the computer data stored in said memory means, and an element for moving among different documents in a selected file of said data.

4. A display unit according to claim 1, wherein said command elements on said top cover frame include a scrolling device for rapid selection of computer data for display on said screen, an element for moving among different files of the computer data stored in said memory means, and an element for moving among different documents in a selected file of said data.

* * * * *